UNITED STATES PATENT OFFICE.

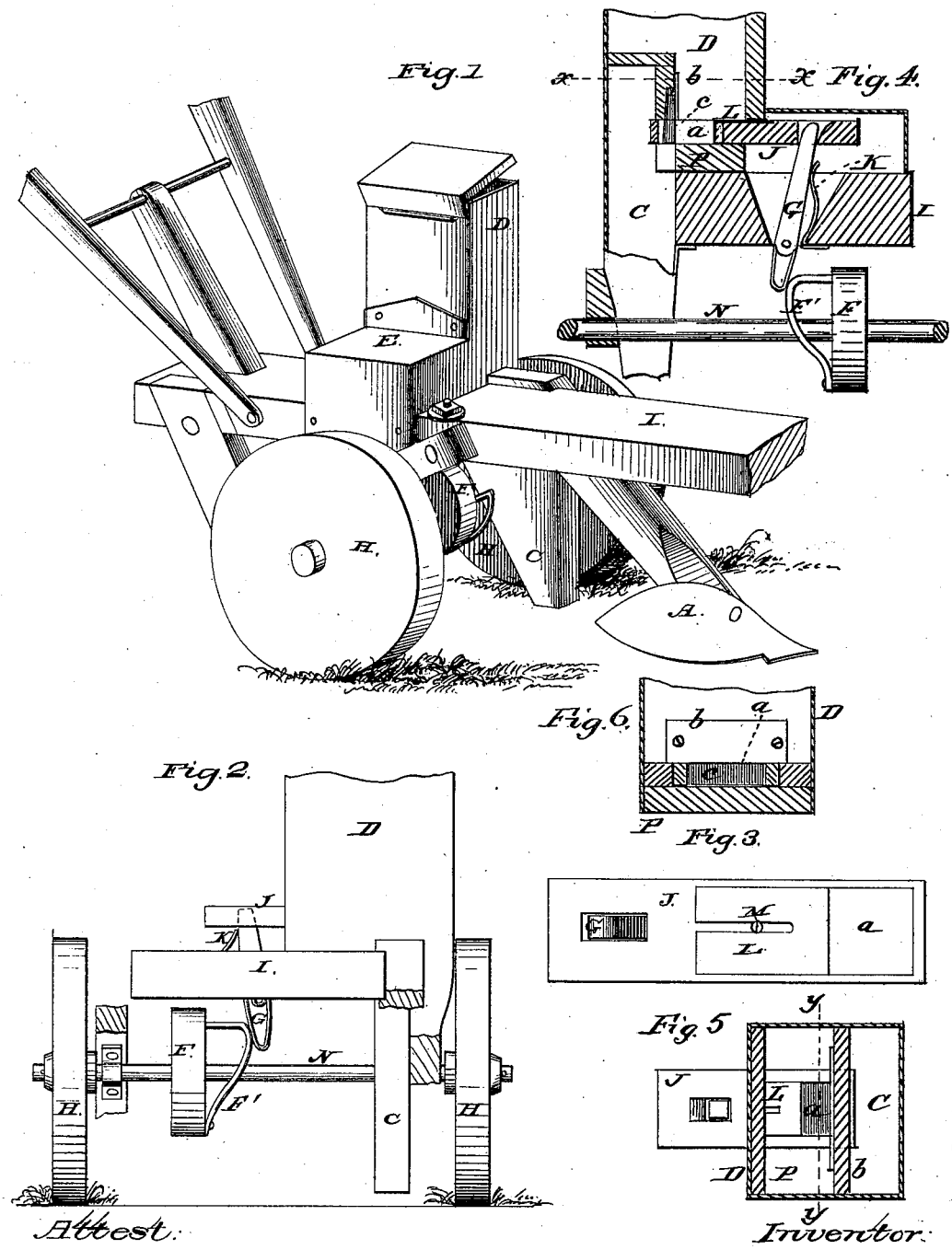

JOHN V. CLOYD, OF WHITLEY COURT-HOUSE, KENTUCKY.

IMPROVEMENT IN CORN-PLANTERS.

Specification forming part of Letters Patent No. 200,029, dated February 5, 1878; application filed April 11, 1877.

*To all whom it may concern:*

Be it known that I, JOHN V. CLOYD, of Whitley Court-House, in the county of Whitley and State of Kentucky, have invented a new and useful Improvement in Corn-Planters, which improvement is fully set forth in the following specification.

I use with my planter an opening and covering plow, carried by a beam, upon which the corn-hopper is arranged, and the seed-dropping slide of which is operated from an axle supported in bearings upon two oppositely-inclined side braces for the plow-standards, and which axle is turned, to operate the slide device, by carrying-wheels arranged in such relation to the plows, the plow-beam, and the handles as to hold the machine steady while planting and cause it to run easy.

The seed-conducting tube is arranged in rear of the opening-plow, and the hopper is above said tube at one side of the beam. The bottom of the hopper is half open and half closed, the seed-conducting tube being beneath the open part, and the seed-dropping slide works in a guide above the closed part, so that the mortise in the slide will be brought over the closed part to fill with the seed, and then carry and drop it through the open part. The hopper has a covered partition near its bottom, and from which depends a brush, just above the inner edge of the closed part, and projects into the mortise of the slide, which moves back and forth with the side walls of the mortise in contact with the opposite ends of the brush, which crosses said mortise, and extends down to the top of the closed part of the bottom.

The object of this arrangement is to form the end of the mortise next to the conductor by the brush, so that when the slide is drawn into the seed-hopper to fill the mortise the brush will form the outer end of said mortise, and prevent the corn from passing out. The reverse movement of the slide brings the corn in the mortise against the brush, and, pushing it outward over the conductor, allows the corn to drop from the mortise into said conductor. In this way the bottom of the mortise, formed by the bottom of the hopper, is kept free from the accumulation of dust from the corn.

In the accompanying drawings, Figure 1 represents a view, in perspective, of a corn-planter embracing my invention; Fig. 2, a front elevation, showing the device for operating the dropping-slide; Fig. 3, a top view of the dropping-slide; Fig. 4, a vertical section through the hopper and its dropping-slide, showing the arrangement of the brush within the mortise of said slide; Fig. 5, a horizontal section of the hopper, on line $x\ x$ of Fig. 4; and Fig. 6, a cross-section on line $y\ y$ of Fig. 5.

The opening-plow A is secured to one side of the beam I, and the covering-plow is secured to the other side of said beam in rear of the plow A. The corn-conductor C is secured beneath the beam, at the side thereof, and in rear of the plow A, and the seed-hopper D is secured upon the beam above the conductor.

The standards of the plows are braced by braces extending in opposite oblique directions from the standards to the beam, and in these braces are the bearings of a transverse axle, N, having wheels H H thereon, outside of the plows, said axle being arranged in rear of the conducting-tube. A small wheel, F, is arranged upon this axle, with a cam-shaped knee, F′, on its face, which acts upon the lower end of a vertical arm, G, pivoted within a mortise in the beam, and connected to the slide J, by which the latter is operated within the hopper. The manner of effecting this, to plant in hills, will presently be described.

The bottom of the hopper is partly open and partly closed, and the slide J is adapted to be moved crosswise of the beam, upon the closed part P, between guides. The slide has a mortise, $a$, the bottom of which, when the slide is drawn out, is formed by the closed part P of the hopper-bottom, as in Figs. 4 and 5, so that the mortise $a$ fills with seed. The inward movement of this slide carries the mortise out over the conducting-tube and beneath a covered partition, $b$, in the lower portion of the hopper, as in Fig. 4.

I arrange a brush, $c$, Figs. 4 and 6, formed of stout bristles, in the lower edge of the hopper-partition $b$, so as to extend crosswise into the slide-mortise, and form thereby the inner end of said mortise, to prevent the corn from passing out at that point as the slide is drawn out to bring its mortise within the hopper to receive the corn. The inward movement of the slide to drop the corn forces it against the brush, and pushes it back into the mortise-space, to allow the corn to drop down the conducting-tube. The brush crosses from one side of the mortise to the other, and extends to the top of the closed part P at the bottom of the mortise. This gives an easy movement to the slide, and keeps it from being choked with dust from the corn.

The outer end of the mortise is formed by an adjustable plate, L, and that is set in or out and held by a clamp-screw, M, to increase or diminish the size of the mortise, to regulate the number of grains to be planted in the hills.

The outward movement of the slide is effected by the knee-cam F', and its inward movement is made by a spring, K, secured in the beam-mortise so as to act upon the upper end of the pivoted arm G, and constantly tend to force the slide inward.

The wheels H H run upon the ground when the plows are at their proper depth. The wheels H H are twenty-eight inches in diameter, and the cam-wheel F is three inches in diameter, which causes the seed to be dropped the proper distance apart for the hills. This distance can be regulated by increasing the number of cams, so as to operate the slide a greater number of times to each revolution of the wheels.

The planter will plant corn in rows each way, with the aid of furrows or marks, by starting correctly at the end of each row.

It will be noticed that after the seed has been dropped from the slide-mortise the outer closed end of the mortise serves to return the brush to a vertical position as the slide brings the mortise again within the hopper, so that the brush has a movement at its lower end in and out with the movement of the slide.

I claim—

In a corn-planter, the combination, with the mortised slide J a, of the hopper-brush c, arranged to extend into and across said mortise, and form the movable end thereof next to the dropping-conductor, as herein set forth.

JOHN V. CLOYD.

Witnesses:
THOMAS JESSE EARLY,
WILLIAM CUMMINS.